United States Patent [19]

Roberts

[11] Patent Number: 5,056,361
[45] Date of Patent: Oct. 15, 1991

[54] DUAL STRAIN GAGE BALANCE SYSTEM FOR MEASURING LIGHT LOADS

[75] Inventor: Paul W. Roberts, Yorktown, Va.

[73] Assignee: The United States of America as represented by the Administrator of the National Aeronautics and Space Administration, Washington, D.C.

[21] Appl. No.: 584,018

[22] Filed: Sep. 18, 1990

[51] Int. Cl.⁵ .......................... G01L 5/16; G01M 9/00
[52] U.S. Cl. .................................. 73/147; 73/862.04; 73/862.65
[58] Field of Search ................ 73/147, 862.65, 862.04, 73/862.67, 802, 775, 777

[56] References Cited

U.S. PATENT DOCUMENTS

| | | | |
|---|---|---|---|
| 3,447,369 | 6/1969 | Horanoff | 73/147 |
| 3,561,264 | 2/1971 | Needham et al. | 73/147 |
| 3,878,713 | 4/1975 | Mole | 73/147 |
| 4,107,986 | 8/1978 | Jones | 73/862.04 |
| 4,475,385 | 10/1984 | Farmer | 73/147 |
| 4,682,494 | 7/1987 | Reed | 73/147 |
| 4,712,431 | 12/1987 | Hatamura | 73/862.04 |
| 4,845,993 | 7/1989 | Horne et al. | 73/147 |

Primary Examiner—Donald O. Woodiel
Attorney, Agent, or Firm—Kevin B. Osborne; Harold W. Adams

[57] ABSTRACT

A dual strain gage balance system for measuring normal and axial forces and pitching moment of a metric airfoil model imparted by aerodynamic loads applied to the airfoil model during wind tunnel testing includes a pair of non-metric panels being rigidly connected to and extending towards each other from opposite sides of the wind tunnel, and a pair of strain gage balances, each connected to one of the non-metric panels and to one of the opposite ends of the metric airfoil model for mounting the metric airfoil model between the pair of non-metric panels. Each strain gage balance has a first measuring section for mounting a first strain gage bridge for measuring normal force and pitching moment and a second measuring section for mounting a second strain gage bridge for measuring axial force.

13 Claims, 3 Drawing Sheets

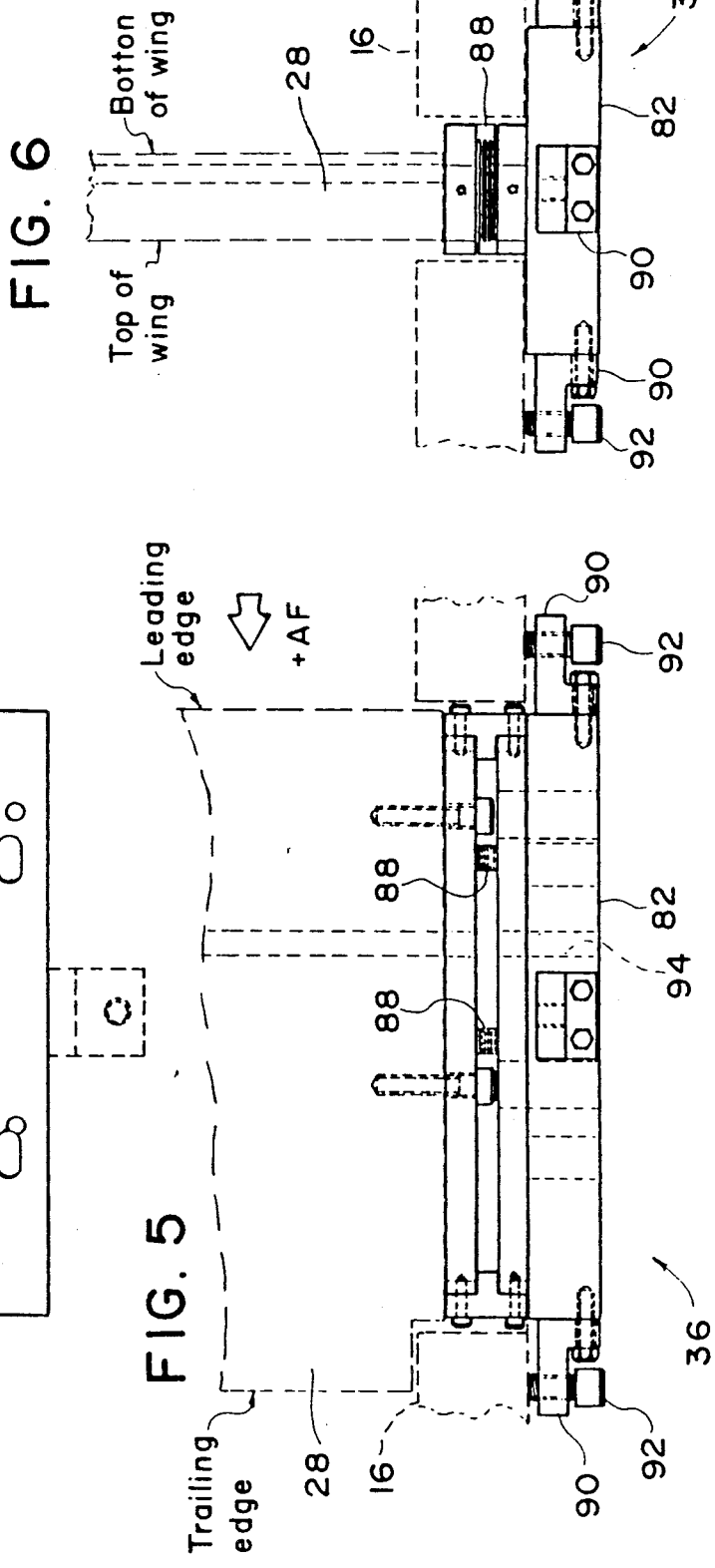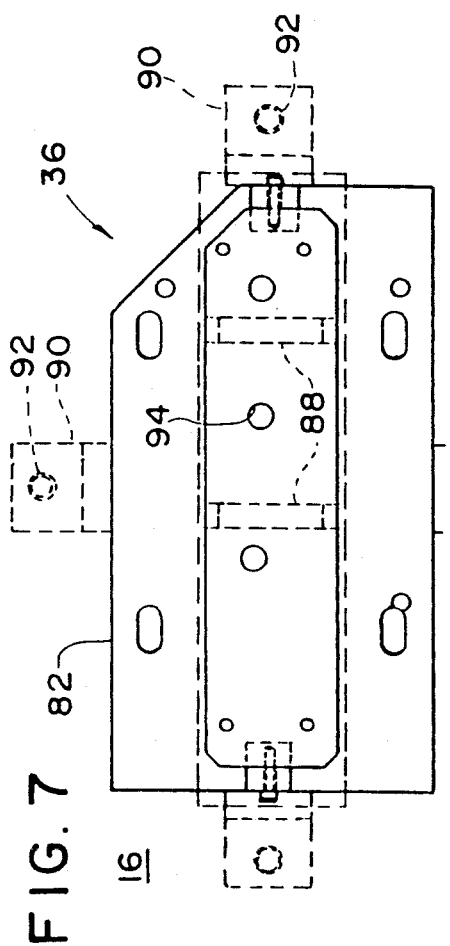

DUAL STRAIN GAGE BALANCE SYSTEM FOR MEASURING LIGHT LOADS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The present invention relates generally to the field of measuring and testing and, more specifically, to a dual strain gage balance system for measuring light loads experienced by airfoil models during wind tunnel testing.

FIELD OF THE INVENTION:

When testing airfoil models in a low turbulence pressure tunnel (LTPT), it is necessary to obtain direct force data to verify calculated pressure to force correlations.

An example of an airfoil model having particular measurement difficulties is the Eppler-387 drag model from NASA's Langley Research Center. The airfoil is described in *NASA Technical Memorandum* 4062, in an article entitled "Experimental Results For the Eppler-387 Airfoil At Low Reynolds Numbers in the Langley Low-Turbulence Pressure Tunnel" by McGhee et al, NASA Langley Research Center, Hampton, Virginia (1988).

The expected loads of the Eppler-387 airfoil presents a difficult measurement situation due to the need to simultaneously measure very small axial (drag) forces and relatively large normal (lift) forces and pitching moments. For example, the expected forces were as follows: 8.0 lb. of normal force, 0.5 lb. of axial force, and 16 in. lb. of pitching moment. In addition to measuring the aforestated test loads, a measurement system would be required to handle initial model loads and a 100% overload on all components.

The axial or drag force described above is very small compared to the normal or lift force. The weight of the scaled model of the Eppler-387 airfoil was about 3 lbs. and, due to the overall sizes and lightness of the drag force relative to the other forces and in absolute terms, a particularly difficult problem arose for measuring the loads. Thus, due to the large ratio of normal force to axial force (16:1), previously used strain gage balance test apparatuses and procedures are inadequate.

SUMMARY OF THE INVENTION

An object of the present invention is to provide a strain gage balance system for measuring light loads in which the ratio of normal force to axial force is relatively high.

Another object of the present invention is to provide a strain gage balance system for measuring light loads in which the test model is grounded on opposite ends for simultaneous measurement of lift and drag forces and pitching moment.

These and other objects of the invention are met by providing a dual strain gage balance system for measuring normal and axial forces and pitching moment of a metric airfoil model imparted by aerodynamic loads applied to the airfoil model during wind tunnel testing, including a pair of non-metric panels rigidly connected to and extending towards each other from opposite sides of the wind tunnel, and a pair of strain gage balances, each connected to one of the non-metric panels and to one of the opposite ends of the metric airfoil model for mounting the metric airfoil model between the pair of non-metric panels, each strain gage balance having a first measuring section mounting the first strain gage bridge 16 the second strain gage bridge means for measuring normal and pitching moment and a second measuring section mounting second strain gage means for measuring axial force.

These and other features and advantages of the dual strain gage balance system of the present invention will become more apparent with reference to the following detailed description and drawings.

BRIEF DESCRIPTION OF THE DRAWINGS

FIG. 5 is a top plan view, partly in section, showing a thermal flexure assembly used in the dual strain gage balance system according to the present invention;

FIG. 6 is a sectional view of the thermal flexure assembly of FIG. 5, turned 90°.

FIG. 7 is a side view of the thermal flexure assembly of FIG. 5.

DETAILED DESCRIPTION OF THE PREFERRED EMBODIMENTS

Figure 1:
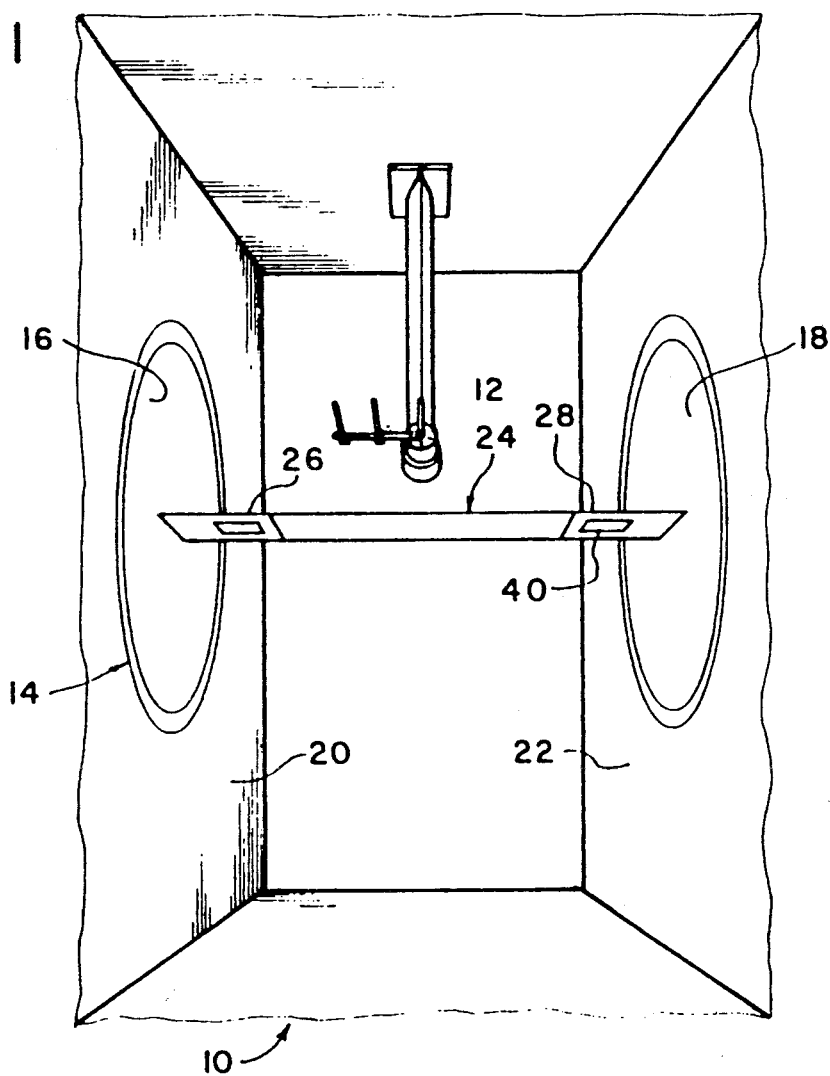
FIG. 1 is a perspective view from within a wind tunnel showing an airfoil model using the strain gage balance system to the present invention.
Figure 2:
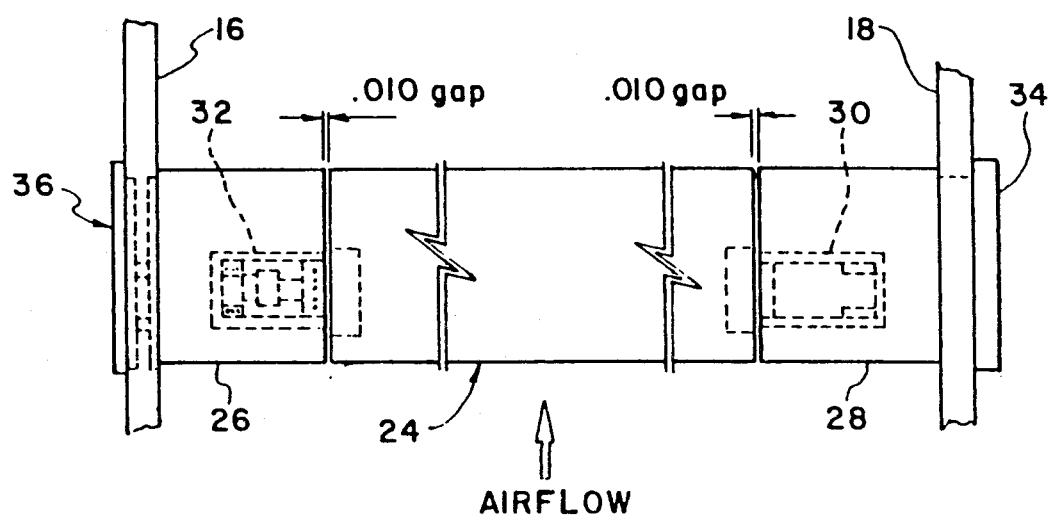
FIG. 2 is a schematic view illustrating the metric airfoil model mounted between non-metric panels extending inwardly from disks of a turntable.

Referring now to FIGS. 1 and 2, a dual strain gage balance system according to the present invention is used for measuring normal and axial forces and pitching moment of a metric airfoil model imparted by aerodynamic loads applied to the airfoil model during wind tunnel testing. The wind tunnel 10 is a low turbulence pressure tunnel (LTPT) provided with instrumentation 12 and a turntable 14 having two disks 16 and 18, each being rotatably mounted in opposite side walls 20 and 22, respectively, of the wind tunnel 10.

A metric airfoil model 24 is mounted between two non-metric panels 26 and 28, each being secured to its corresponding disk and extending inwardly from an opening provided in each disk. The "metric" airfoil model 24 is the object of measurement, while the "non-metric" panels 26 and 28 are not to be measured. However, the shape of the panels corresponds to that of the airfoil model so as to form a continuous structure spanning the width of the wind tunnel 10.

A pair of strain gage balances 30 and 32 are used to connect the airfoil model 24 between the panels 26 and 28. Each is connected to one of the non-metric panels and to one of the opposite ends of the metric airfoil model 24. The panel 26 is held in position by a mounting plate 34 which can be positioned in an opening provided in the disk 18 after undergoing alignment procedures (to be described below). The panel 28 is connected to the disk 16 through an opening similar to that provided in the disk 18, except that instead of a mounting plate, a thermal flexure 36 is used to mount the panel 28 to the disk 16 while compensating for thermal loads imparted on the airfoil model 24 such that expansion and contraction of the airfoil model 24 will not adversely effect the readings of the strain gages.

Figure 3:
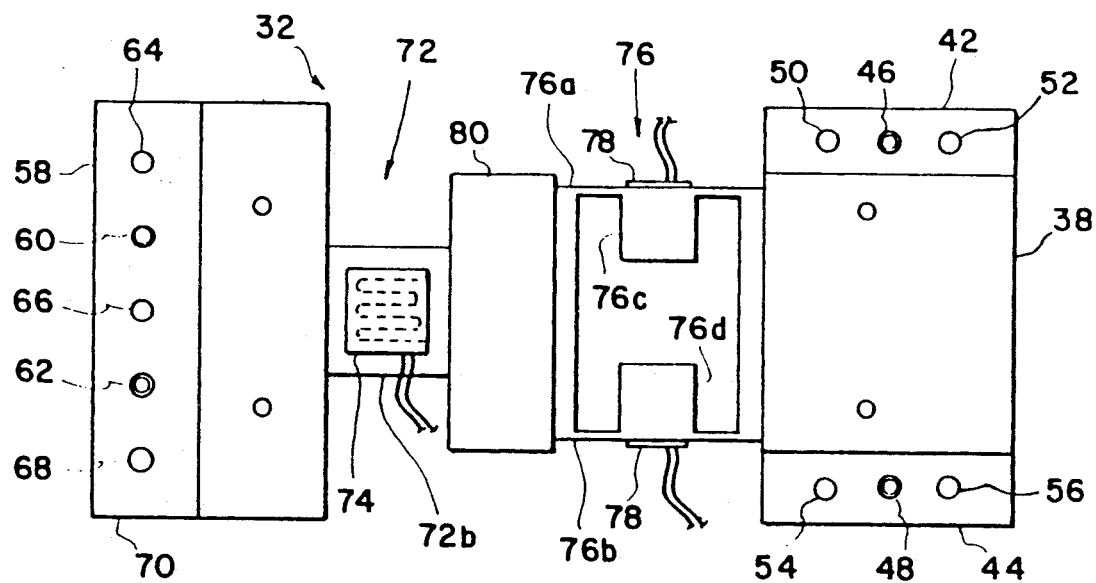
FIG. 3 is a side elevational view of one of the balances of the dual strain gage balance system according to the present invention.
Figure 4:
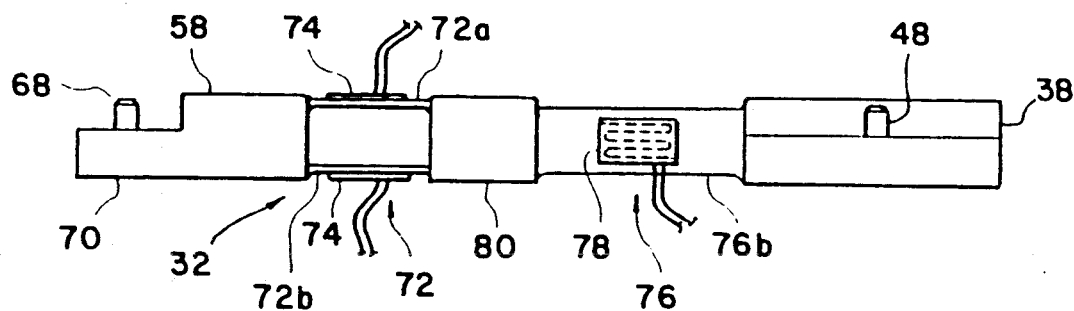
FIG. 4 is a top view of the balance of FIG. 3.

Referring now to FIGS. 3 and 4, a right-hand one of the two balances 32 is identical to the left-hand one of the two balances 30, such that a description of balance 32 will adequately describe the balance 30. The balance 32 has a first end portion 38 connectable to the non-metric panel 28 at a recess formed in the bottom of the panel 28. As shown in FIG. 1, a cover plate 40 is fastened to the panel 28 flush with the bottom thereof after installation of the balance. The first end portion 38 includes a pair of opposite side flanges 42 and 44 with dowel alignment pins 46 and 48, and mounting holes 50, 52, 54 and 56, all of which are used to align and secure the end portion 38 to the pane 28.

A second end portion 58 is connectable to the metric airfoil model 24 in a similar manner by means of dowel pins 60 and 62 and openings 64, 66, and 68. The dowel pins and holes are provided in a flange 70 of the end portion 58.

A first measuring section 72 is juxtaposed and connected to the second end portion 58 for mounting strain gages 74. The strain gages measure strains proportional to the applied normal force and pitching moment of the airfoil model 24. The normal force corresponds to lift. The first measuring section 74 includes a pair of rectangular beams 72a and 72b on which the strain gages 74 are fixedly connected.

A second measuring section 76 is juxtaposed and connected to the first end portion 38 for mounting strain gages 78 which measure strains proportional to the applied axial force. The second measuring section 76 includes a pair of center reinforced beams 76a and 76b, each of which is integrally formed with stiffening blocks 76c and 76d. The axial force corresponds to the drag component, which is substantially less than the normal force (lift) and the pitching moment.

The two measuring sections 72 and 76 are interconnected through an intermediate body 80, and the entire balance 32 is preferably made from a single piece of steel.

The balance described above is effective for simultaneously measuring very small axial forces and relatively large normal forces and pitching moments. The force measurement system was used to test NASA Langley's Eppler-387 drag model, in which the force measurement system was designed to measure anticipated test loads of 8 lb. of normal force, 0.5 lb. of axial force, and 16.0 in. lb. of pitching moment. In addition to measuring these test loads, the system was required to handle initial model loads and a 100% overload on all components. The system was required to maintain a 0.010 in. maximum clearance between the metric airfoil model and the non-metric panels. The illustrated embodiment of the present invention which was used to test the Eppler-387 drag model has a size of 2 in. by 3.7 in. by 0.3 in.

Each of the balances according to the present invention was designed to react half of the aerodynamic loads applied to the center airfoil. The balances are attached to the airfoil model by screws (not shown) threadedly engaging the holes provided in the end portions of the balances. When assembled, the airfoil model and panels span the tunnel test section extending transversely between the disks of the turntable on the tunnel sidewalls.

The two measuring sections 72 and 76 were provided because of the large ratio of normal force to axial force (in the example of the Eppler-387, the ratio was 16:1). The strain gages of the section 72 measure both the normal force and the pitching moment, while the section 76 has strain gages which measure the actual force. The sections 76 are designed with center reinforced beams 76a and 76b for stiffening while minimally affecting the axial force output. The strain gages of the measuring beams are wired together in a wheatstone bridge arrangement as is customary in strain gauging techniques. The electrical output of the strain gages correlates to the aerodynamic loads imposed on the airfoil model for each measurable component of force.

The strain gages are preferably model NK-06-SO22H-50 strain gages manufactured by Micromeasurements, Inc. of North Carolina. The strain gages preferably have a nominal resistance of 5,000 ohms, which is preferable to lower resistance models which are typical of conventional transducer gages because the higher resistance provides the capability of allowing higher input voltages while drawing small amounts of current. Higher input voltages yield larger outputs, and as a result, the measuring beams were strained to low values while still producing acceptable output voltages. Using the 5,000 ohm gages along with the lower strain values allow the measuring beams to be larger in size. As a result, the balances are less fragile and can resist larger overloads. Also, strain gage heat build-up occurring in the 5,000 ohm gages will be less than the build-up in the 350 ohm gages (which are commonly used in transducer gages) for similar input voltages. The balances themselves are preferably made of 17-4 pH steel which has high strength and good spring characteristics.

Prior to fully calibrating the airfoil model and balance system, the left and right-hand balances are individually check calibrated. A calibration stump and fixture of the type normally used in calibrating procedures are employed Calibration hardware allows direct force application over each measuring element's electrical moment center. The ability to apply pure forces, 4.0 lbs. of normal force and 0.25 lbs. of axial force for the Eppler-387 airfoil model, enables the generation of normal and axial force sensitivities. The normal pitching moment sensitivity is generated by transferring 4 lbs. of normal force to 2 inches from the normal force gage section's electrical moment center. The application of these forces allow testing of both the left and right-hand balances to yield outputs which correspond to expected design values.

The complete model and balance system is set-up on a surface plate following the individual balance check calibration described above. An extremely precise set-up is required in order to maintain metric airfoil to non-metric panel clearances of 0.010 in. while holding the balances' initial electrical offset values to a minimum. The airfoil model 24 is first set-up using dummy balances for alignment. Each dummy balance (not shown) has the same end portions as the "live" balance, but the measuring sections are solid to avoid flexing. The use of dummy balances is generally known as a initial system alignment technique to avoid misalignment. In the present example, a system misalignment resulting in a beam deflection in excess of 0.001 in. can cause an overloading of the balance. Precise alignment of the balances of the present invention begins with weighing the metric airfoil so that the amount of balance preload can be determined. In the case of the Eppler-387 airfoil model, the model weighed 3 lbs. Each dummy balance was then loaded with counterweights equal to half the airfoil weight. This allowed the two non-metric panels to be precisely aligned by producing panel deflections similar to those present when the metric airfoil is in position. Using a dial indicator to reference similar points, the balance attachment flanges at the opposite end portions are then aligned by trial and error methods of shimmying the non-metric panels into position.

Afterwards, the dummy balances are removed and the metric airfoil and live balances are installed. Both balances are fitted with lockouts (not shown) and connected to a power source and readout (both not shown). This enables outputs of the balances to be continuously monitored during installation. With the live balances attached to each end, the metric airfoil is then raised into place. The alignment dowels are then fitted into their respective mating holes and the balances secured with screws. Then, the lockouts are carefully removed. The installation and alignment procedure produces an electrical offset (in the example of the Eppler-387 airfoil model) of less than 0.700 mV with an input of 10.0 V, which was well within the preload tolerances of the balances.

In the past, linear bearings have been used on the ends of an airfoil model due to the fact that as temperature changes, the airfoil tends to expand or contract. The linear bearings were not designed to account for temperature swings which produce errors, most significantly in the axial force component. The linear bearings were designed to allow adjustments of the model length. However, the linear bearings often do not allow the system to readjust until the expansion or contraction overcomes the bearing's friction force.

The present invention includes a thermal flexure which is designed to reduce the temperature-related calibration error. The flexure is used in place of the linear bearing described above and is used instead of a left-hand mounting plate 34. The thermal flexure is best illustrated in FIGS. 5 and 6. The flexure 36 is mounted in the opening of the disk 16. A first plate 82 is rigidly connected to the disk 16 by threaded fasteners 84. A second plate 84 is fixedly connected to the panel 28 also by threaded fasteners 86. A plurality of flex beams 88 are disposed between the two plates and are fixedly connected to both the two plates so as to provide a soft spring constant in the direction of the thermal loads. The thermal flexure design uses flex beams which are sized to keep the flexure's outline identical to that of the left-hand mounting plate. The flexure used in the example of the present invention applied to the Eppler-387 airfoil model has a spring constant of 577 lbs. per square inch in the direction of expansion or contraction. Therefore, a force of 11.5 lb. applied by thermal expansion or contraction is required to deflect the flexure 0.020 in. A 0.020 in. deflection results in the flexure having a stress safety factor, in the example described herein, of 4.6. Model weight, normal force, and pitching moment can combine under certain conditions to apply a load to the flex beams 88 in the normal force plane. Individual flex beams are oriented so that loads are carried in compression or tension with little or no bending moment. This orientation allows the flex beams 88 to be very stiff to loads in the normal force plane. Leveling brackets 90 and jacking screws 92 are included in the thermal flexure to allow more flexibility in model system alignment during wind tunnel installation.

The thermal flexure is installed using jacking screws and shims to level the airfoil model in two planes while maintaining the required 0.010 in. gap between the metric airfoil and the non-metric panels.

Calibration loads are then applied to the metric airfoil via a leveling and loading fixture. The fixture (not shown) fits the contour of the airfoil and 8 lbs. of normal force is applied (in the example of the Eppler-387 airfoil model) over the airfoil's center of pressure, and 16-inch pounds of pitching moment was generated by transferring the full normal force two inches forward or aft of the center of the pressure. A half-pound axial force is applied as a cable load through a small bell crank assembly (not shown). The axial cable is preferably light to reduce cable sag which could effect the direction of the applied force vector. Following the sensitivity loadings, crossload are applied and data from the left and right-hand balances are combined to establish system sensitivities.

For installation in the wind tunnel, a procedure similar to those used in the laboratory set-up described above are employed. Thermal flexure and non-metric panels are mounted to the disks of the turntable. An electronic inclinometer, dial gage indicators and an alignment bar that spans the tunnel are used to align the two non-metric panels. The dummy balances are then installed and half of the metric airfoil weight applied to each side. The left-hand balance mounting tab on the thermal flexure's side is initially set level in all planes. This is done because the thermal flexure's spring constant is much softer than that of the solid mounting plate. Therefore, the thermal flexure is expected to deflect under load much more than the solid mounting plate on the right-hand side of the tunnel. The right-hand balance's mounting tab is then shimmied into alignment with the mounting tab on the thermal flexure's side. Following alignment of the mounting tabs, the dummy balances and counterweights are removed and live balances are attached to the metric airfoil and the leads guided through holes 94. The metric airfoil and balances are then raised into place and connected to the non-metric panels. Tunnel check loads are applied and the laboratory calibration is repeated.

With the system described above, system accuracies have been verified and calculated to be approximately ±1.0% on all components, over most of the test envelope. Aerodynamic tests have yielded data in close agreement with forces and moments that were theoretically predicted and derived from previous aerodynamic pressure tests for the Eppler-387. Thus, the present invention allows for a dual balance force measurement system that accurately measures a very small axial force given the previously discussed design constraints.

Numerous modifications and adaptations of the present invention will be apparent to those so skilled in the art and thus, it is intended by the following claims to cover all such modifications and adaptations which fall within the true spirit and scope of the invention.

What is claimed is:

1. A dual strain gage balance system for measuring normal and axial forces and pitching moment of a metric airfoil model imparted by aerodynamic loads applied to the airfoil model during wind tunnel testing, comprising:
   a pair of non-metric panels being rigidly connected to and extending towards each other from opposite sides of the wind tunnel; and
   a pair of strain gage balances, each connected to one of the non-metric panels and to one of the opposite ends of the metric airfoil model for mounting the metric airfoil model between the pair of non-metric panels, each strain gage balance having a first measuring section mounting first strain gage means for measuring normal force and pitching moment and a second measuring section mounting second strain gage means for measuring axial force.

2. A dual strain gage balance system according to claim 1, wherein the first measuring section of each strain gage balance includes a first pair of rectangular beams disposed with major surfaces substantially to the aerodynamic loads.

3. A dual strain gage balance system according to claim 1, wherein the second measuring section of each strain gage balance includes a second pair of beams disposed with major surfaces substantially to the aerodynamic loads.

4. A dual strain gage balance system according to claim 3, wherein the second pair of beams have center stiffening means.

5. A dual strain gage balance system according to claim 1, wherein the first and second strain gage means comprise 5,000 ohm strain gages.

6. A dual strain gage balance system according to claim 1, wherein the pressure tunnel has a transversely mounted turntable including a pair of disks rotatable in opposite side walls of the pressure tunnel.

7. A dual strain gage balance system according to claim 6, further comprising a mounting plate fixedly connecting one of the non-metric panels to one cf the disks through an opening therein.

8. A dual strain gage balance system according to claim 7, further comprising a thermal flexure yieldably connecting the other of the non-metric panels to the other of the disks through an opening therein.

9. A dual strain gage balance system according to claim 8, wherein the thermal flexure includes a first plate fixedly connected to an outer wall of the disk, a second plate fixedly connected to the non-metric panel, and spring means disposed between the first and second plates having a predetermined spring constant in the direction of expansion and construction of the metric airfoil model for compensating thermal effects on the airfoil model.

10. A dual strain gage balance system according to claim 9, wherein the spring means comprises a plurality of flex beams.

11. A dual strain gage balance system according to claim 9, wherein the thermal flexure includes a plurality of leveling brackets coupled to the first plate.

12. A strain gage balance system comprising:
a first end portion connectable to a non-metric panel;
a second end portion connectable to a metric airfoil model;
a first measuring section juxtaposed to the second end portion for mounting first strain gage means for measuring normal force and pitching moment, said first measuring section comprising a first pair of rectangular beams;
a second measuring section juxtaposed to the first end portion for mounting second strain gage means for measuring axial force, said second measuring section comprising a second pair of rectangular beams; and
an intermediate body interconnecting said first and second measuring sections.

13. A strain gage balance system according to claim 12, wherein the second pair of rectangular beams are center reinforced by means of integrally formed blocks.

* * * * *